Aug. 4, 1964          L. R. TEEPLE, JR          3,143,051
         COMBINATION STREAK AND FRAMING CAMERA
Filed March 3, 1961                     2 Sheets-Sheet 2
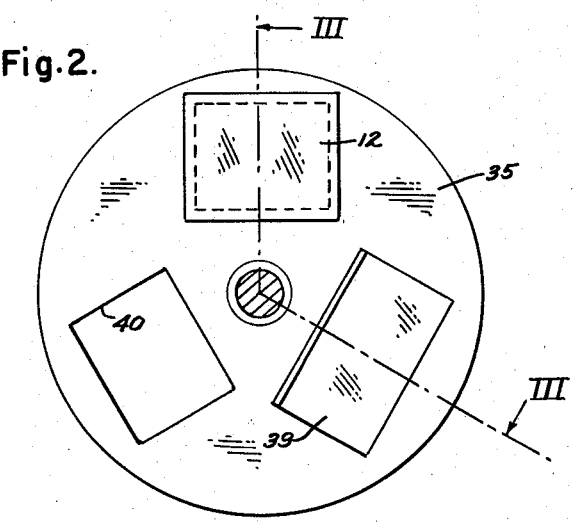
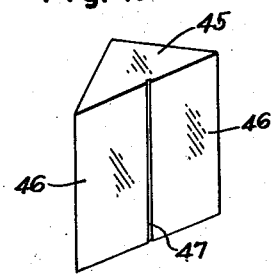
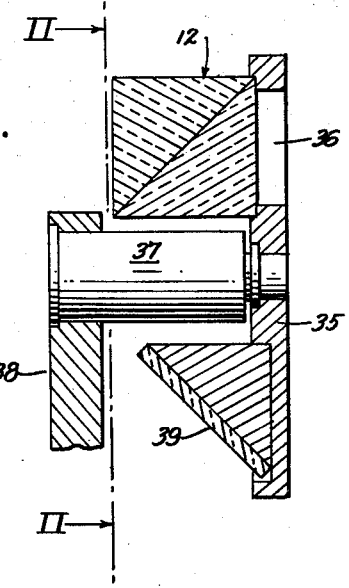
INVENTOR.
LAWRENCE R. TEEPLE JR.
BY
ATTORNEYS.

United States Patent Office 3,143,051
Patented Aug. 4, 1964

3,143,051
COMBINATION STREAK AND FRAMING CAMERA
Lawrence R. Teeple, Jr., Palo Alto, Calif., assignor, by mesne assignments, to Beckman & Whitley, Inc., San Carlos, Calif., a corporation of Delaware
Filed Mar. 3, 1961, Ser. No. 93,200
5 Claims. (Cl. 95—36)

This invention relates to high speed photography and particularly to high speed cameras of the rotating mirror type and is directed to a camera capable of producing two entirely different types of records of a single event and at the same time.

There are two types of cameras for making records of entirely different kinds, one is a framing camera which includes a rotating mirror to sweep a beam of light containing the image of an event across the surface of a sensitized film. In this camera, relay lenses and suitable stops intercept the beam so that the film is exposed in successive steps or frames to produce a series of still pictures or exposures taken in rapid succession during the event. One example of such a camera is disclosed in United States Letters Patent to Miller, Number 2,400,887 for "High Speed Motion-Picture Camera."

The other type of camera, referred to as a streak camera, sweeps a focused beam over a film or moves the film relative to the beam without intervening relay lenses. The resulting exposure is in the form of a streak or blurred image on the film. Such cameras are employed to produce records usually of luminous events and the records are used much as a graph or chart from which information is gained regarding rate of object motion perpendicular to the direction of sweep.

Both framing and streak cameras of the high speed type are costly and their use requires technical skills in setting up and triggering for the exposure of an event, the duration of which may be no more than one or two microseconds. Furthermore there is a need for a camera capable of making a frame record and a streak record of the same event to enable correlation of technical data gained from both records.

It is, therefore, the object of the present invention to provide a camera capable of simultaneously recording a streak-type record and a frame-type record.

Another object of the invention is to provide a camera of this kind with means for recording either type of record alone and means for quickly converting the camera from one type to the other.

Still further objects and advantages of the invention and the manner in which it is carried into practice are made apparent in the following specification by reference to the accompanying drawings.

In the drawings:

FIG. 2 is an enlarged view on line II—II of FIG. 3 of a portion of the camera shown in FIG. 1;

FIG. 3 is a sectional view taken on the line III—III of FIG. 2; and

FIG. 4 is a perspective view of a mirror element employed in a modified form of the camera shown in FIG. 1.

Figure 1:
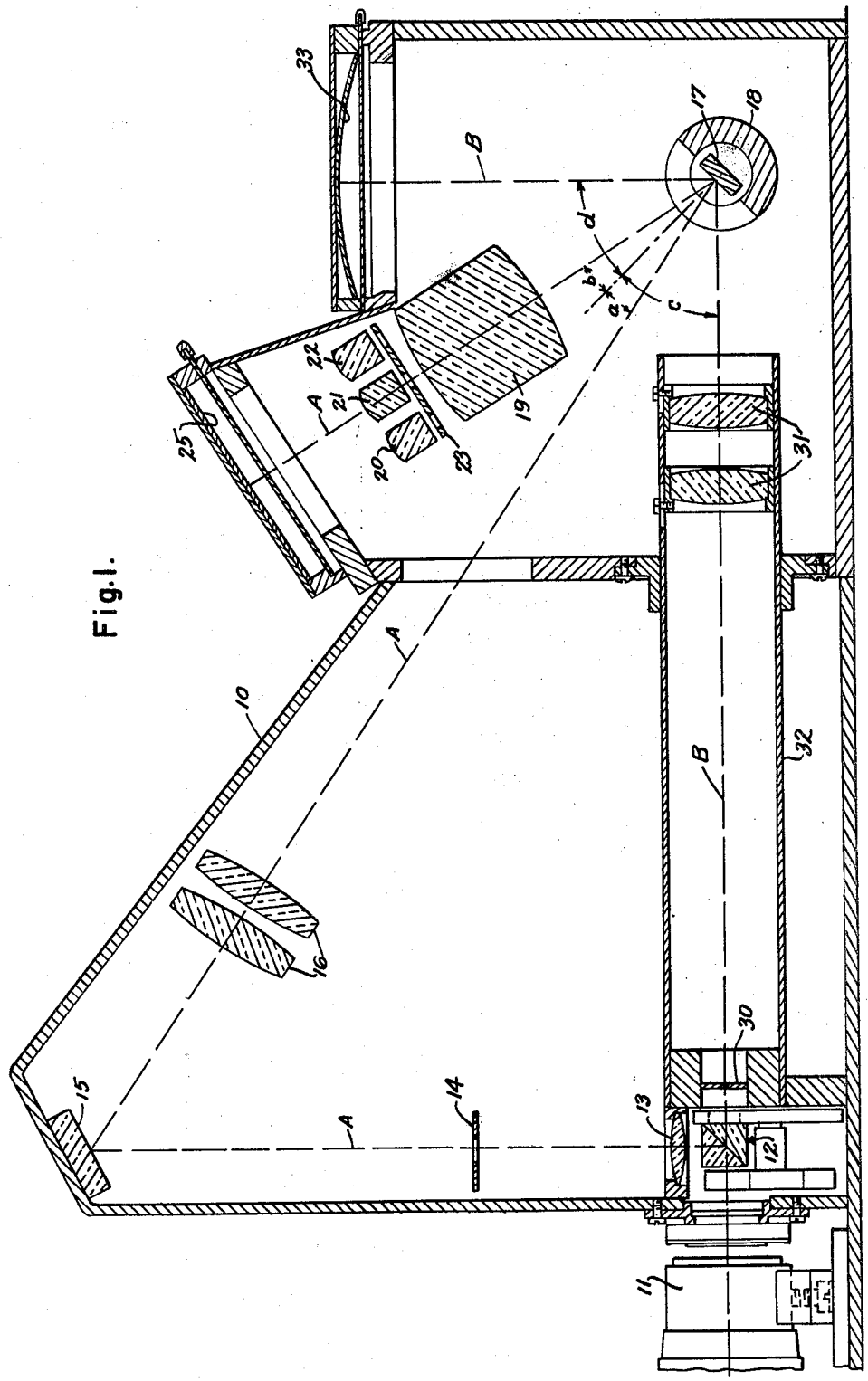
FIG. 1 is a schematic view in section through a camera embodying the present invention and showing the main optical elements and paths through which light passes but omitting certain mounting brackets for the optical elements and other details which are not necessary to an understanding of the present invention.

In FIG. 1 of the drawings a light tight camera housing is indicated at 10. A focused beam of light from an event to be recorded enters the housing after having passed through an objective lens system, a portion of which is shown at 11. This beam of light impinges on the partially mirrored surface of a beam splitter 12 of the type known as an amplitude splitter. Such beam spliters may be formed of two transparent prisms combined to form a rectangle with the partially mirrored surface on one of the abutting angularly disposed faces. It is the purpose of such a splitter to interrupt or reflect a portion of the light in the beam at right angles to the direction of its impingement and to transmit the remainder of the beam on substantially the same course or axis that it entered the splitter.

According to the present invention each of the separated beams is employed to produce a record on a separate film. Following first the reflected beam, the center of which is represented by a broken line A, it passes first through a field lens 13 then through a first stop 14 in the form of a masking plate with an aperture which defines that portion of the beam containing the image of the event being recorded. Next the beam is reflected by a mirror 15 and passes through a system of relay lenses 16 after which it impinges on a rotating mirror 17 operated by a conventional turbine, a part of the housing of which is shown at 18. This mirror reflects the beam and sweeps it across a large objective lens 19 by means of which it is transmitted through a series of relay lenses shown as three in number at 20, 21 and 22. A second stop plate is disposed at 23 in front of the relay lenses and is provided with three apertures, one for each lens corresponding in size and shape to the aperture in the first stop 14 so that as the mirror 17 rotates the image of the event is exposed three successive times at spaced intervals on a film 25. Any desired number of relay lenses such as those shown at 20, 21 and 22 may be employed and a corresponding number of exposures will be made on the film 25. The film is carried in a conventional flat film holder, the details of which are not shown herein but which includes a ground glass plate and means for viewing the same to enable setting up and focusing prior to the insertion and exposure of a film therein.

Now following the path of the streak camera beam which is shown at B, after passing through the amplitude splitter 12 this beam passes thrrough a narrow slit in an opaque plate 30 as an extremely narrow image is preferred for recording the streak effect upon film. This beam also passes through a relay lens system 31 having up to this point been isolated by a tubular housing 32. After passing through the relay lens system, it impinges on the rotating mirror 17 and is reflected thereby onto a film 33 in a film pack similar to the one which contains the film 25 but within which film is supported on an arcuate surface, the arc being struck from a center which is adjacent the face of the mirror 17. This maintains a uniform focal distance as the beam is swept across the length of the film 33.

From the description so far, it is apparent that a single rotating mirror is employed for exposing the same event at the same time in the manner of a framing camera on one film and in the manner of a streak camera on a separate film. This is possible because the beam containing an image of the event being recorded is made to approach the mirror at two different angles and, as is illustrated, with the mirror in a central position with respect to exposure of the beams on the films. The angle of incidence "a" is equal to the angle of reflection "b" for projecting the beam A toward the film 25 while the angle of incidence "c" is equal to the angle of reflection "d" for projecting the beam B toward the film 33.

While it is highly desirable in many cases to make two different types of exposure of the same event, there are also cases where it may be desired to use the present camera either as a streak camera or as a framing camera. To enable simple conversion of the camera from one type to the other, the amplitude splitter 12 is carried on a disc 35 as best shown in FIGS. 2 and 3 opposite an aperture 36 in the disc. A bearing housing for rotatably supporting the disc 35 is shown at 37 as carried in a bracket, a portion of which is indicated at 38. The disc also carries a mirror 39 and has a second aperture 40 either of which can upon rotation of the disc be brought into the path of the beam entering the camera through the main objective lens system 11. When it is desired to use the camera as a framing camera, the mirror 39 is swung into the position normally occupied by the amplitude splitter so that all of the light entering the camera is reflected along the course A of FIG. 1. In order to expose an event on the film of the streak portion of the camera, the disc is rotated to bring the aperture 40 in line with the main beam so that all of the light follows the course B of FIG. 1. Means, not shown, are employed for rotating the disc from one position to the next and may include detents or stops for retaining the disc in any one of its three usable positions.

A modified form of the camera described above is obtained by the use of a mirror shown in FIG. 4 in place of the amplitude splitter shown at 12 in FIGS. 2 and 3. In FIG. 4 a transparent prism is shown at 45 as having one surface 46 completely coated with silver or the like to form a mirror with the exception of a narrow area or slit indicated at 47. This prism is combined with a similar unmirrored prism (not shown) to form a configuration like that of the amplitude splitter shown at 12 in FIGS. 2 and 3 and occupies the same position in the camera as the splitter 12.

With this type of mirror assembled in the camera of FIG. 1 the plate 30 with its slit may be removed and a narrow beam of light from the main objective system passes through the slit formed in the mirror and follows the course B as previously described to produce a streak image on the film 33. At the same time, the mirrored surface 46 reflects light along the course A to produce framed images of an event on the film 25.

The modification of the invention just described is preferred for certain uses. For example, where more light is desired the full surface mirror 46 passes substantially all of the light available to the film which receives the framed record. That small amount of light which passes through the slit 47 is lost to the framed record but the slit passes all of the light that can be used in producing a streak record. Another advantage of the present modification is that the presence of the slit 47 centrally of the mirrored surface 46 produces a fine, dark line through the framed exposures on the film 25 and this dark line on the record indicates the exact area which was used in producing the streak exposure. In other words, this vertical line extending through the frame exposures serves as a reference mark to identify the precise position at which the streak exposure was made thereby assisting in the correlation of information gained from the two records produced by the camera.

This mirror 46 with its slit or narrow unmirrored portion may be considered a beam splitter and in the following claims this term is employed in its broader sense as indicating either the beam splitter of FIG. 1 or that of FIG. 4 as well as other types of devices capable of intercepting a beam of light and directing portions of it through separate optical systems.

Another advantage of the camera of the present invention in either of the modifications disclosed is that the axes of both optical systems are maintained in a common plane which is normal to the axis of rotation of the rotating mirror so that all of the images produced are the result of beams the axes of which are normal to the surfaces of the films and a high degree of resolution is obtained.

I claim:

1. A combination streak and framing camera comprising a housing, a rotatable mirror therein, means for directing a focused beam of light containing an image of an event to be recorded into the housing, a beam splitter intercepting said beam and dividing it into two separate paths, separate optical systems in said paths for focusing the beams therein toward said mirror from different angles, and means to support film in two positions for separately recording images from the beams in said separate paths as they are swept across the film upon rotation of the mirror.

2. The combination of claim 1 in which the beam splitter is carried on an adjustable member having a mirror and an aperture, and means to adjust said member to bring the mirror into the focused beam for directing all of the light therefrom through one of said focused paths, or to bring said aperture into position to admit all of the light to the other of said focused paths.

3. A combination streak and framing camera comprising a housing, a rotatable mirror therein, means for directing a focused beam of light containing an image of an event to be recorded into the housing, a beam splitter intercepting said beam and dividing it into two separate paths, separate optical systems in said paths for focusing the beams therein toward said mirror from different angles, and means to support film in two positions for separately recording images from the beams in said separate paths as they are swept across the film upon rotation of the mirror, one of said optical systems being of the streak type and the other of the framing type.

4. A combination streak and framing camera comprising a housing, a rotatable mirror therein, means for directing a focused beam of light containing an image of an event to be recorded into the housing, a beam splitter intercepting said beam and dividing it into two separate paths, separate optical systems in said paths for focusing the beams therein toward said mirror from different angles, and means to support film in two positions for separately recording images from the beams in said separate paths as they are swept across the film upon rotation of the mirror, the axes of said separate beams being in a common plane normal to the axis of rotation of the mirror.

5. A combination streak and framing camera comprising a housing with a rotating mirror therein, means for directing a focused beam of light from an event to be recorded into the housing toward said mirror, a splitter intercepting said beam and comprising a mirror with a slit formed by a narrow unmirrored portion thereof, a film in the housing, an optical system for directing a beam passing through said slit to said rotating mirror and film to produce a streak record, a second film in the housing, and an optical system for directing a beam from the mirror on the splitter to said rotating mirror and second film to produce a frame record thereon.

References Cited in the file of this patent

UNITED STATES PATENTS 2,821,106 Ranft _____ Jan. 28, 1958